# (12) United States Patent
Liao et al.

(10) Patent No.: US 8,068,669 B2
(45) Date of Patent: Nov. 29, 2011

(54) TEXT AND GRAPHIC SEPARATION METHOD AND TEXT ENHANCEMENT METHOD

(75) Inventors: Wu-Jie Liao, Taipei (TW); Meng-Yun Ying, Taipei (TW)

(73) Assignee: Primax Electronics Ltd., Taipei (TW)

( * ) Notice: Subject to any disclaimer, the term of this patent is extended or adjusted under 35 U.S.C. 154(b) by 1049 days.

(21) Appl. No.: 11/940,183

(22) Filed: Nov. 14, 2007

(65) Prior Publication Data

US 2008/0253655 A1 Oct. 16, 2008

(30) Foreign Application Priority Data

Apr. 13, 2007 (TW) .............................. 96112964 A

(51) Int. Cl.
*G06K 9/34* (2006.01)
*G06K 9/00* (2006.01)

(52) U.S. Cl. ......................... 382/173; 382/176; 382/181

(58) Field of Classification Search .................. 382/173, 382/176, 181
See application file for complete search history.

(56) References Cited

U.S. PATENT DOCUMENTS

| | | | | |
|---|---|---|---|---|
| 7,672,022 B1* | 3/2010 | Fan | ............................... | 358/474 |
| 2004/0174546 A1* | 9/2004 | Guleryuz | ........................ | 358/1.9 |
| 2004/0175037 A1* | 9/2004 | Guleryuz | ........................ | 382/180 |
| 2008/0089614 A1* | 4/2008 | Roussel et al. | ................. | 382/300 |
| 2008/0310738 A1* | 12/2008 | Katoh et al. | .................. | 382/225 |

* cited by examiner

*Primary Examiner* — Samir Ahmed
*Assistant Examiner* — Fred Hu
(74) *Attorney, Agent, or Firm* — Kirton & McConkie; Evan R. Witt

(57) ABSTRACT

The present invention provides a text and graphic separation method and a text enhancement method. The text and graphic separation method is used for separating texts and graphics of an image and comprises coarse classification and advanced classification. The method of the present invention also adjusts the luminance of the text to enhance the text image according to the separation result.

14 Claims, 3 Drawing Sheets

TEXT AND GRAPHIC SEPARATION METHOD AND TEXT ENHANCEMENT METHOD

FIELD OF THE INVENTION

The present invention relates to a graphic and text separation method and a text enhancement method.

BACKGROUND OF THE INVENTION

Recently, multi-function peripheral device is popular for digital image processing. It provides functions for image scanning and printing. In Multi-function peripheral device, graphic and text separation and text enhancement are often processed in Multi-function peripheral device.

Document usually comprises a graphic part and a text part. By way of graphic and text separation processing, the graphic part and the text part can be separated for further processing. For example, in case of without graphic/text separation process, when printing a document, printers use color ink to print the whole content. That is, the text part will be printed with color ink as well and therefore wastes color ink. However, in case of having graphic and text separation process, the graphic part is printed with color ink and the text part is printed with black ink and therefore the color ink is saved.

The graphic and text separation methods of prior art comprise a hue adjusting method, an edge detecting method and a chroma and luminance detecting method. These prior art methods do not classify the image according to text and graphic, but apply a single process on the whole image. It won't provide a good graphic and text separation result without classifying the image according to graphic and text. For example, the hue adjusting method adjusts the hue of the whole image, such as increasing the hue of the brighter part of the image and reducing the hue of the darker part of the image, to separate graphic and text. Because graphics and texts are subjected to the same process of hue adjusting, it will impact the hue of the whole image.

Besides, the edge enhancement method often incorrectly recognized the noise and graphics of the image of document as texts and therefore generated error recognition result. However, applying the method which used chroma and luminance to separate text and graphic on low or zero chroma photos will also fault the result.

The purpose of text enhancement is to make the image of text clearer. The prior art methods for text enhancement do not separate text and graphic before the text enhancement process, but adjust the luminance of the whole image to clear the text image. However, such adjustment will decrease the hue of the graphics of the document.

SUMMARY OF THE INVENTION

The first purse of the present invention is to provide a graphic and text separation method which generates correct separation result by dividing a document image into plural image chips and determining the type of each image chip.

The other purpose of the present invention is to provide a text enhancement method which generates good enhancement result by separating the graphic part and the text of the image first then enhancing the text part.

According to the present invention, a graphic and text separation method, for separating a graphic part and a text part of an image, comprising: (a). coarse classification steps comprising: a1. dividing the image into plural rows and dividing each of the rows into plural chips, wherein each of the chip includes plural pixels; a2. classifying the plural chips into several chip types including photo chip, white chip, black chip, screen chip, semi-screen chip and undefined chip; and a3. calculating the number of luminance transition of each chip to determine if the chip is a transition chip or a text-on-photo chip; and (b). advanced classification steps, comprising: b1. determining if the undefined chips are text chips; b2. grouping the plural chips into several blocks, wherein each block comprises J×K chips and assigning each block as a photo block, background block or a non-photo block according to the chip types included in the block; b3. modifying the types of chips of each block; and b4. determining if the non-photo blocks shall be modified into photo block according to the types of two neighbor blocks; and (c). a step of detecting texts on photo, determining another block range with a center at one target text-on-photo chip, wherein the another block range comprises L×M chips, and determining if the transition chips within the another block range shall be modified into text-on-photo chips or if the text-on-photo chips within the another block range shall be modified into photo chips according to the number of text chips within the another block range.

In an embodiment, in the step a2, the determination of the chip types is made according to chroma statistic, luminance statistic, boundary detection and screen detection.

The chroma statistic comprising: classifying each pixel of each chip into colorless pixel, mid-color pixel or colorful pixel, and determining if the pixel is a photo pixel.

In an embodiment, the each pixel of the image is classified as colorless pixel, mid-color pixel and colorful pixel according to the following rules: set a matrix with the center at the pixel and calculate the chroma and luminance of the plural peripheral pixels around the center pixel of the matrix, wherein the matrix is an M×M matrix; classifying the plural peripheral pixels into the colorless pixel, mid-color pixel and colorful pixel; and determining if the pixel is a photo pixel according to the numbers of mid-color pixel and colorful pixel of the plural peripheral pixels.

In an embodiment, a photo chip is determined according to the number of photo pixel.

In an embodiment, the luminance statistic comprising classifying the pixels of the image into a white pixel, a gray pixel or a black pixel.

In an embodiment, each pixel is classified as white pixel, gray pixel or black pixel according to the following rules: set a matrix with the center at one target pixel and calculate the luminance of the plural peripheral pixels around the center pixel of the matrix, wherein the matrix is an M×M matrix; classifying the plural peripheral pixels into white pixel, gray pixel and black pixel; and determining if the center pixel is white pixel, gray pixel or black pixel according to the numbers of white pixel, gray pixel and black pixel of the plural peripheral pixels.

In an embodiment, a white chip is determined according to the number of background pixel contained in the chip, a chip is photo chip is determined according to the number of gray pixel contained in the chip and a black chip is determined according to the number of black pixel contained in the chip.

In an embodiment, the edge detection comprising calculating the edge values of each pixels of the image; determining if the pixel is an effective edge according to the absolute value of the edge value; calculating the gradients of the pixels of effective edges; and classifying the pixel with a gradient value larger than 0 as text pixel and the pixel with a gradient value smaller than 0 as white pixel.

In an embodiment, the step of determining a screen chip or a semi-screen chip is according to the number of screen pixel contained in the chip.

In an embodiment, a screen pixel is determined according to the following rules: with the center at one target pixel, using a Laplacian gradient operator to determine if the peripheral pixels are located at a screen area; determining if the target pixel is a screen pixel according to the number of pixels located at the screen area.

In an embodiment, the luminance transition calculation comprising calculating the number of luminance transition of each chip according to the luminance distribution of the chip; determining the chip with at least one luminance transition as a transition chip; and determining if at least one of three neighbor pixels is a text-on-photo chip according to the number of luminance transition generated by the three neighbor pixels, wherein when the transition number is within a value range and the middle chip of the three neighbor chips is photo chip, the middle chip is determined as text-on-photo chip.

In an embodiment, the step b2 comprising determining a non-photo block according to the number of screen chip and the number of photo chip of the block; determining a photo block according to the sum of the number of photo chip and the number of screen chip and the number of semi-screen chip of the block; determining a photo block according to the sum of the number of photo chip and the number of screen chip and the number of black chip of the block; determining a photo block according to the number of photo chip of the block; and determining a background block according to the number of background chip of the block.

In an embodiment, in the step b4, when at least one block of the two blocks at two sides of a non-photo block is a photo block, modify the non-photo block into a photo block; and modifying the screen chips and black chips of a photo block into photo chip.

The present invention also discloses a text enhancement method, for enhancing the image of a text part of an image comprising a graphic part and the text part, comprising a. a step of separating the graphic part and the text part, comprising: dividing the image into plural rows and dividing each of the rows into plural chips; classifying the chips into photo chips and text chips, wherein the text chips comprise white text chips and black text chips; b. a step of text enhancement comprising set the luminance of the black text chips as 0 and set the luminance of the white text chips as 255.

In another embodiment of the present invention, a text enhancement method, for enhancing the image of a text part of an image comprising a graphic part and the text part, comprising a. a step of separating the graphic part and the text part comprising dividing the image into plural rows and dividing each of the rows into plural chips; classifying the chips into photo chips and text chips, wherein the text chips comprise white text chips and black text chips; b. a step of text enhancement comprising applying an unsharp mask on the text chips to enhance the contrast of the text chips.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
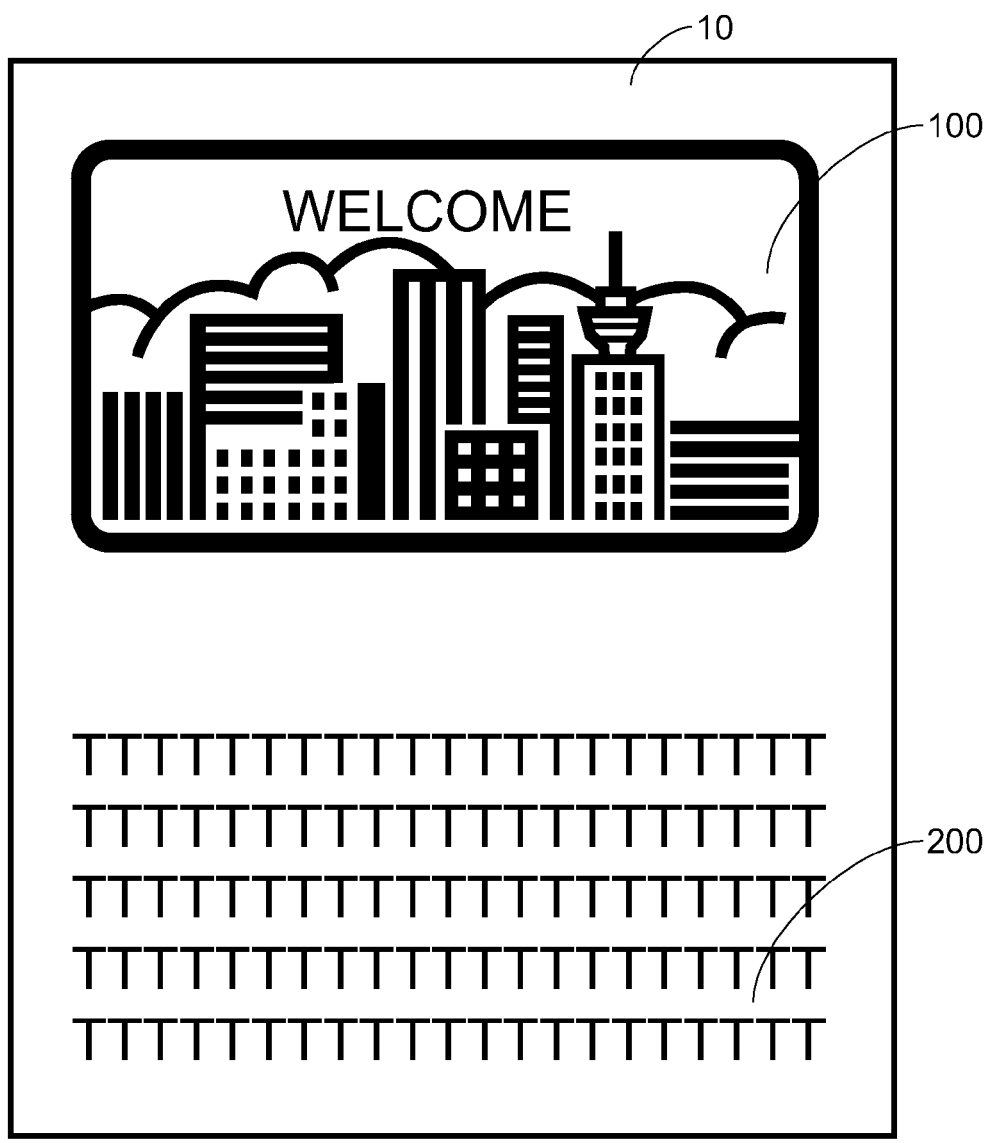
FIG. 1 illustrates a document including graphic part and text part.

Please refer to FIG. 1, it shows a document 10 composed of a graphic part and a text part. As shown in FIG. 1, document 10 comprises a graphic part 100 and a text part 200. The graphic part 100 comprises a photo and a text "WELCOME" on the photo. And the text part 200 is constituted of many characters T.

The graphic and text separation method of the present invention is to recognize the graphic part 100 and the text part 200. And the text enhancement method of the present invention is to enhance the text part 200 after the separation is completed to distinct the text part 200 and the text "WELCOME" on the photo 100.

Figure 2A:
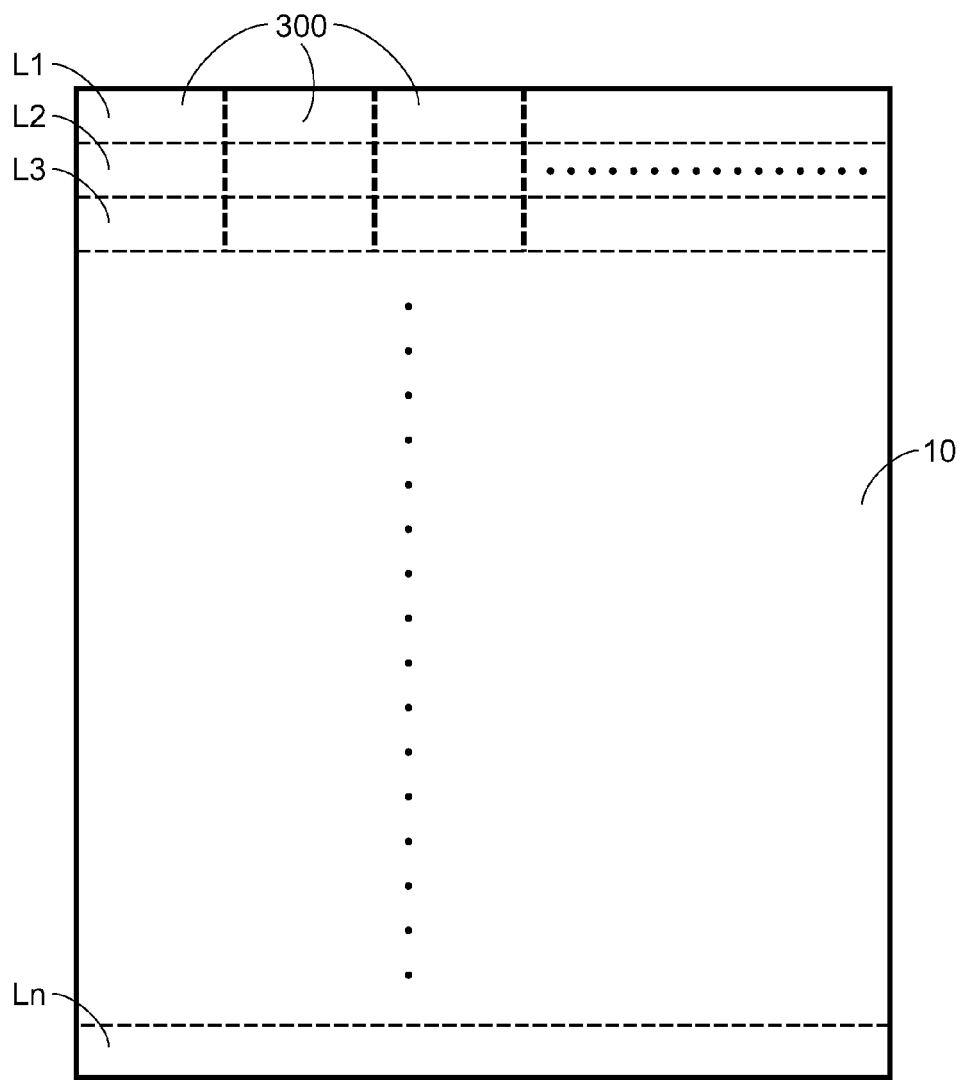
FIG. 2(A) illustrates a document divided into rows and chips.
Figure 2B:
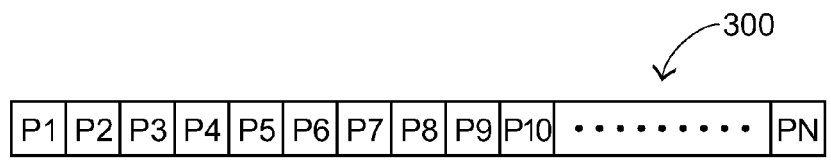
FIG. 2(B) illustrates plural pixels of a chip.

We'll describe details of the graphic and text separation method of the present invention below. Please refer to FIGS. 2A and 2B. As shown in FIG. 2A, the graphic and text separation method of the present invention divides the document image 10 into plural rows L1-Ln and each row is divided into plural chips 300. As shown in FIG. 2B, each chip 300 is constituted of plural pixels, and in FIG. 2B, we take N pixels P1 . . . PN as an example.

After the image of document 10 is divided into plural chips 300, we determine whether each chip belongs to the text part 200 or the graphic part 100 according to several rules and therefore definitely separate the graphic part 100 and the text part 200.

The graphic and text separation method of the present invention comprises tow parts: (1) coarse classification and (2) advanced classification. The method will further comprise a text-on-photo detection step if required. The details will be described as below.

Coarse Classification

In the coarse classification, the method of the present invention classifies the chips of document 10 to photo chip, white chip, black chip, undefined chip, screen chip and semi-screen chip according to chroma statistic, luminance statistic, boundary detection and screen detection. Besides, the method also uses transition detection to find transition chip and text-on-photo chip.

(1). Chroma Statistic

Since the graphic part of document are usually colorful, we can use chroma to identify the graphic part. Chroma statistic comprises generating chroma of pixels from the color difference a,b of pixels and classifying the pixels into colorless pixel, mid-color pixel and colorful pixel according to the luminance of pixels. Since the calculating of chroma and luminance is well known by the skilled person of the art, no more details will be described here.

According to the chroma and luminance of each pixel, we can justify whether the pixel is colorless pixel, mid-color pixel or colorful pixel. Please refer to the table below.

| Luminance | colorful | mid-color | colorless |
| --- | --- | --- | --- |
| A1-A2 | chroma ≧ B1 | B1 > chroma ≧ B2 | chroma < B3 |
| A2-A3 | chroma ≧ B4 | B4 > chroma ≧ B5 | chroma < B6 |
| A3-A4 | | | |
| A4-A5 | | . . . | |
| A5-A6 | | . . . | |

For example, when the chroma of a pixel is larger than or equal to B1 and the luminance of the pixel is between A1 and A2, the pixel is classified as a colorful pixel. When the chroma of a pixel is smaller than B1 and larger than b2, and the luminance of the pixel is between A1 and A2, the pixel is classified as a mid-color pixel, and so forth.

Figure 3:
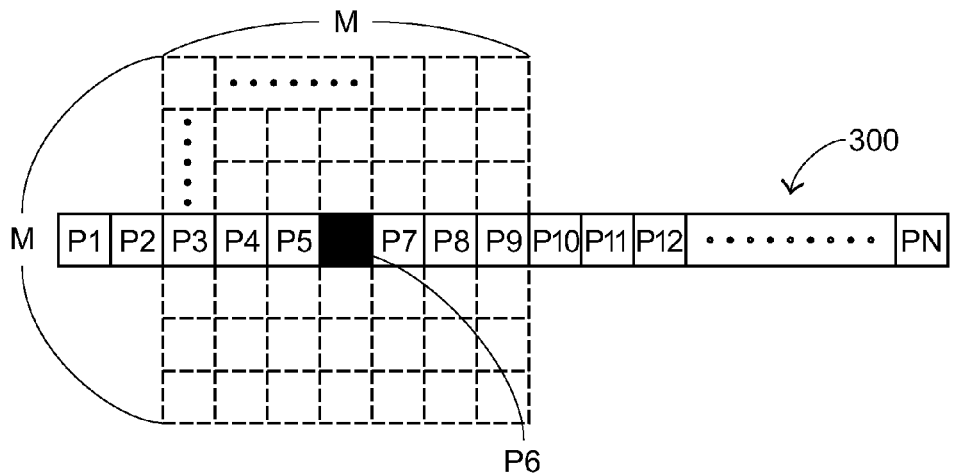
FIG. 3 illustrates an M×M pixel matrix.

In order to justify whether an image chip is photo chip, we have to justify whether the pixels of the chip are photo pixels. Please refer to FIG. 3. In FIG. 3, we are going to justify if pixel P6 is a photo pixel. First, we have a matrix with the center at pixel P6 and calculate numbers of colorless pixel, mid-color pixel and colorful pixel among the peripheral pixels around pixel P6 in the matrix. In FIG. 3, the matrix is an M×M matrix. According to the numbers of colorless pixel, mid-color pixel and colorful pixel contained in the matrix, we can decide whether the pixel P6 is a photo pixel. For example, if the number of mid-color pixel is larger than c1 or the number of colorful pixel is larger than c2, the pixel P6 will be classified as a photo pixel.

According to the rules, we can obtain the number of photo pixel among pixel P1-PN of chip 300 and according to the number of photo pixel to determine if chip 300 is a photo chip. For example, when the number of photo pixel of chip 300 is larger than c3, chip 300 is classified as photo chip.

(2). Luminance Statistic

Luminance statistic is used for classifying image chips into white chip (means the background image of document, also called background chip), gray chip and black chip.

The document image is classified into background, gray and black according to luminance range. Please refer to the table below.

| Classification | Luminance Range |
| --- | --- |
| Bright | L1-L2 |
| Gray | L2-L3 |
| Dark Gray | L3-L4 |

Referring to the rules of Chroma Statistic, before we decide whether a chip is background chip, gray chip or black chip, we have to decide whether each pixel of the chip is background pixel, gray pixel or black pixel.

As shown in FIG. 3, we define an M×M matrix with the center at pixel P6 and classify the peripheral pixels of pixel P6 into background pixel, gray pixel and black pixel. The attribute of pixel P6 is determined according to the numbers of background pixel, gray pixel and black pixel in the M×M matrix.

For example, when the number of bright pixel is larger than d1, the central pixel P6 is a background pixel. When the number of gray pixel is larger than d2, the central pixel P6 is a gray pixel. When the number of dark gray pixel is larger than d3, the central pixel P6 is a black pixel After the attribute of each pixel of each chip was determined, we determine the attribute of each chip according to the numbers of background pixel, gray pixel and black pixel contained in each chip. For example, a chip having more than d4 background pixels is determined as a background chip. A chip having more than d5 gray pixels is determined as a gray chip. A chip having more than d6 black pixels is determined as a black chip. The background chip is usually the background of graphic and generally is white. Because the graphic of document usually has gray tone, so gray chips are classified as photo chip. Besides, black chip means the image being close to black.

(3). Screen Detection

Luminance statistic can be used for identifying the screen area of document image. In the present invention, in addition to the forging chip attributes, we further use luminance statistic to define screen chip and semi-screen chip.

Regarding to document of print, the screen areas are usually colored areas.

The screen chip and the semi-screen chip are determined according to the numbers of screen pixel contained in each chip. For example, a chip having f1 screen pixels is identified as a screen chip. When the number of screen pixel of a chip is larger than f2 but smaller than f1, the chip is identified as a semi-screen chip.

According to the following rules, pixels of each chip are justified as a screen pixel or not:

Defining an M×M matrix with a center at one target pixel and applying Laplacing gradient operator on the peripheral pixels around the center pixel in the matrix to determine if the peripheral pixels locate in a screen area;

Determining if the center pixel is a screen pixel according to the number of pixels in the screen area. If there are more than f4 pixels in the screen area, the center pixel is a screen pixel.

These screen chips or semi-screen chips will be modified as photo chips or text-on-photo chips.

(4). Boundary Detection

The purpose of edge or boundary detection is to find the edges of texts. In the present invention, the undefined chips which are not classified into photo chips, background chips or gray chips may be the text part of the document.

Boundary detection comprises the following steps:
1. Calculating the edge value of each pixel.
2. Determining if the pixel is a valid pixel according to the absolute value of the edge value.

For example, if the edge value is larger than e1, the pixel is a valid pixel. If not, the pixel is an invalid pixel.

3. Calculating the gradient of the valid edge.

If the gradient of the pixel is larger than 0, the pixel is a low-brightness edge. If the gradient of the pixel is smaller than 0, the pixel is a high-brightness edge.

4. Classifying the pixels with their gradients more than 0 as text pixels, and the pixels with their gradient smaller than 0 as background pixels.

It is noted that the calculations of edge value and gradient are well known by the skilled persons in the art, no more details will be disclosed in the specification.

(5). Transition Detection

Transition detection is used to find the rapid luminance change in space or time axis, especially the change of suddenly becoming black or white. In the present invention, we'll calculate the numbers of transitions of each chip to determine which chips are transition chip or text-on-photo chip.

Figure 4:
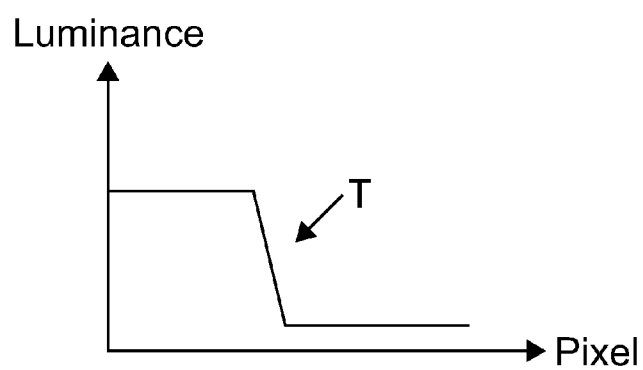
FIG. 4 illustrates luminance transition.

Please refer to FIG. 4, it shows an example of the luminance transition of a chip. FIG. 4 shows the luminance curve of all pixels of a chip and a rapid luminance change T of pixels (i.e. suddenly from high brightness to low brightness, means the luminance difference between two neighbor pixels is very large), and T is called a transition.

Transition detection comprises the following steps:

According to the distribution of luminance of each chip's pixels to determine if the chip has a transition;

Set the chip with the transition as a transition chip; and

Determining if at least one of the a plural transition chips is determined as a text-on-photo chip. For example, we calculate the sum of transition of three neighbor transition chips. If the sum of the transition is larger than g1 and smaller than g2, we justify the middle chip of the transition chips as text-onphoto chip. The middle chip must be classified as photo chip or screen chip according to chroma statistic or as a screen chip according to screen detection. The chips without the mentioned transition sum are still classified as transition chip.

Advanced Classification

According to the chroma statistic and luminance statistic, we classify the chips of the document into 6 chip types including photo chip, white chip, black chip, undefined chip, screen chip and semi-screen chip for the advanced classification steps. In the advanced classification, the purpose is to classify all chips into photo chip, white chip, black chip and text chip. After the advanced classification, all undefined chips will be classified as text chip. Besides, after the advanced classification, a step for detecting text-on-photo chip is performed. The transition chips and text-on-photo chips identified in the luminance transition detection will be used to detect text-on-photo chips.

In the advanced classification, we first determine the types of the undefined chip and then combine plural chips as a block. We'll determine the type of each block and classify the blocks into photo block, background block and non-photo block. In other words, in the advanced classification, based on two-dimensional concept, according to the types of neighbor chips, we precisely modify the types of chip obtained in the coarse classification steps. Then we determine the type of a block constituted by plural chips. After the block type is determined, the undefined chips in the block are classified as the same type as the block.

In the following, we'll describe the classification with the unit of chip.

The photo type chips usually locate at graphic part of document, white chips usually belong to background of document, black chips are the black part of texts, and the undefined chips means the chips which can not be classified into any specific types. Generally, the undefined chips are possible the text part of document. However, the undefined chips may be photo chips. So we need to verify in the advanced classification if the undefined chips belong to text part.

Next, we'll describe the process of modifying chip types in the unit of block. We assume a block has J×K chips. The type of each block is determined according to the chip types contained in the block. The rules are listed in the following table.

| Number of Chip Type in Each Block | Possible Image Type | Block Type |
| --- | --- | --- |
| Number of screen chip <= m1 and Number of photo chip < m2 | Text | Non-photo block |
| Number of photo chip + Number of screen chip + Number of semi-screen chip <= m3 | Photo | Photo Block |
| Number of photo chip + Number of screen chip >= m4, and Number of block chip >= m5 | Photo | Photo Block |
| Number of photo chip >= m6 | Photo | Photo Block |
| Number of background chip >= m7 | Background | Background Block |

Each block is classified as non-photo block, photo block or background block according to the table. Then in each block, we modify the chips which may be photo chips (such as screen chip, semi-screen chip and black chip) into photo chips, or modify the semi-screen chip into un-define (text) chip. Next, we further use the correlation between neighbor blocks to modify block types.

Figure 5:
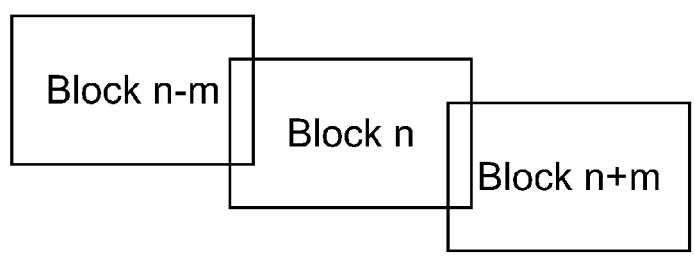
FIG. 5 illustrates a serial of neighbor blocks.

As shown in FIG. 5, for the non-photo type block n, if the m neighbor blocks at two next sides of block n are all photo blocks, the block n will be modify into photo type block.

The screen chips and black chips in photo blocks are modified into photo chips. Besides, after the advanced classification, the unmodified semi-screen chips will be classified as un-define chips. If the pixels of un-define chips have edge characteristic (according to the edge detection step), the undefined chips will be classified as text chips. Besides, if the pixels concluded in a single undefined chip are all black pixels or white pixels, the undefined chip will be classified as text chip.

After the advanced classification are completed, all undefined chips are classified as text chips.

Step for Detecting Text-on-Photo

We can use the numbers of text-on-photo chips within another range of blocks to detect texts printed on photo. The range is usually rectangle, that is, the horizontal distance is longer than the vertical distance. The determination of the block range usually relates to the size of the target text. (The size of target text means the pixel number of the text image.) For example, when the number of text-on-photo chips of a block is larger than a specific value, we determine the block being located at text part and we modify the transition chips in the block into text-on-photo chips. And when the number of text-on-photo chips within a block is smaller than the specific value, we modify the text-on-photo chips into photo chips.

Text Enhancement

After the graphic and text separation process is completed, we can use the separation result to perform the text enhancement. Because the photos and texts have been classified into graphic part (photo chips), background part (white chips) and text part (black chips), we can easily process the chips according to the types of chip to get good result of text enhancement, but won't improperly change the hue of graphic part of document. During the enhancement process, we won't process the photo chips which represent the graphic part of document, but adjust the luminance of text chips (including the texts on background and the texts on photo) to distinct the text part.

Text chips are classified into white text chip or black text chip according to the luminance of pixels of each chip. When a chip has N1 pixels with their luminance larger than T1, the text chip is determined as white text chip. When a chip has N2 pixels with their luminance smaller than T1, the text chip is determined as black text chip. We can set the luminance of each black chip as 0 and set the luminance of each white chip as 255. Thus, we make the black part blacker and the white part whiter. Another method is to apply unsharp mask process on the data of each chip to increase the contrast of text chips.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A graphic and text separation method, for separating a graphic part and a text part of an image, comprising:
    (a). coarse classification steps, comprising:
    a1. dividing the image into plural rows and dividing each of the rows into plural chips, wherein each of the chip includes plural pixels;
    a2. classifying the plural chips into several chip types including photo chip, white chip, black chip, screen chip, semi-screen chip and undefined chip; and a3. calculating the number of luminance transition of each chip to determine if the chip is a transition chip or a text-on-photo chip; and (b). advanced classification steps, comprising:

b1. determining if the undefined chips are text chips;

b2. grouping the plural chips into several blocks, wherein each block comprises J×K chips and assigning each block as a photo block, background block or a non-photo block according to the chip types included in the block;

b3. modifying the types of chips of each block; and b4. determining if the non-photo blocks shall be modified into photo block according to the types of two neighbor blocks; and (c). a step of detecting texts on photo determining another block range with a center at one target text-on-photo chip, wherein the another block range comprises L×M chips, and determining if the transition chips within the another block range shall be modified into text-on-photo chips or if the text-on-photo chips within the another block range shall be modified into photo chips according to the number of text chips within the another block range.

2. The graphic and text separation method according to claim 1, wherein in the step a2, the determination of the chip types is made according to chroma statistic, luminance statistic, boundary detection and screen detection.

3. The graphic and text separation method according to claim 2, wherein the chroma statistic comprising:

classifying each pixel of each chip into colorless pixel, mid-color pixel or colorful pixel, and determining if the pixel is a photo pixel.

4. The graphic and text separation method according to claim 3, wherein each pixel of the image is classified as colorless pixel, mid-color pixel and colorful pixel according to the following rules:

set a matrix with the center at the pixel and calculate the chroma and luminance of the plural peripheral pixels around the center pixel of the matrix, wherein the matrix is an M×M matrix;

classifying the plural peripheral pixels into the colorless pixel, mid-color pixel and colorful pixel; and determining if the pixel is a photo pixel according to the numbers of mid-color pixel and colorful pixel of the plural peripheral pixels.

5. The graphic and text separation method according to claim 4, wherein a photo chip is determined according to the number of photo pixel.

6. The graphic and text separation method according to claim 5, wherein the luminance statistic comprising: classifying the pixels of the image into a white pixel, a gray pixel or a black pixel.

7. The graphic and text separation method according to claim 6, wherein each pixel is classified as white pixel, gray pixel or black pixel according to the following rules:

set a matrix with the center at one target pixel and calculate the luminance of the plural peripheral pixels around the center pixel of the matrix, wherein the matrix is an M×M matrix;

classifying the plural peripheral pixels into white pixel, gray pixel and black pixel; and determining if the center pixel is white pixel, gray pixel or black pixel according to the numbers of white pixel, gray pixel and black pixel of the plural peripheral pixels.

8. The graphic and text separation method according to claim 7, wherein a white chip is determined according to the number of background pixel contained in the chip, a chip is photo chip is determined according to the number of gray pixel contained in the chip and a black chip is determined according to the number of black pixel contained in the chip.

9. The graphic and text separation method according to claim 8, wherein the edge detection comprising:

calculating the edge values of each pixels of the image;

determining if the pixel is an effective edge according to the absolute value of the edge value;

calculating the gradients of the pixels of effective edges; and classifying the pixel with a gradient value larger than 0 as text pixel and the pixel with a gradient value smaller than 0 as white pixel.

10. The graphic and text separation method according to claim 9, wherein the step of determining a screen chip or a semi-screen chip is according to the number of screen pixel contained in the chip.

11. The graphic and text separation method according to claim 10, a screen pixel is determined according to the following rules:

with the center at one target pixel, using a Laplacian gradient operator to determine if the peripheral pixels are located at a screen area;

determining if the target pixel is a screen pixel according to the number of pixels located at the screen area.

12. The graphic and text separation method according to claim 11, wherein the luminance transition calculation comprising:

calculating the number of luminance transition of each chip according to the luminance distribution of the chip;

determining the chip with at least one luminance transition as a transition chip; and determining if at least one of three neighbor pixels is a text-on-photo chip according to the number of luminance transition generated by the three neighbor pixels, wherein when the transition number is within a value range and the middle chip of the three neighbor chips is photo chip, the middle chip is determined as text-on-photo chip.

13. The graphic and text separation method according to claim 12, wherein the step b2 comprising:

determining a non-photo block according to the number of screen chip and the number of photo chip of the block;

determining a photo block according to the sum of the number of photo chip and the number of screen chip and the number of semi-screen chip of the block;

determining a photo block according to the sum of the number of photo chip and the number of screen chip and the number of black chip of the block;

determining a photo block according to the number of photo chip of the block; and determining a background block according to the number of background chip of the block.

14. The graphic and text separation method according to claim 13, wherein in the step b4, when at least one block of the two blocks at two sides of a non-photo block is a photo block, modify the non-photo block into a photo block; and modifying the screen chips and black chips of a photo block into photo chip.

* * * * *